3,781,338
NITRILOTRIACYLTRIIMINO-TRIS-(2,4,6-TRIIODOBENZOIC ACID) COMPOUNDS
Philip E. Wiegert, St. Louis County, Mo., assignor to Mallinckrodt Chemical Works, St. Louis, Mo.
No Drawing. Continuation-in-part of application Ser. No. 780,296, Nov. 29, 1968. This application Feb. 8, 1971, Ser. No. 113,630
Int. Cl. C07c 101/26
U.S. Cl. 260—501.11         10 Claims

ABSTRACT OF THE DISCLOSURE

Nitrilotriacyltriimino - tris - (2,4,6-triiodobenzoic acid) compounds are useful as X-ray contrast agents. Solutions of their water-soluble salts are less hypertonic than conventional aqueous vasographic media of equivalent iodine content.

A typical symmetrical member of the series has the following structure:

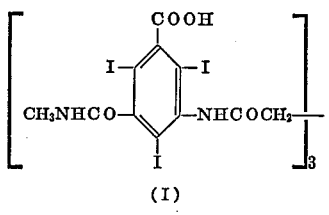

(I)

CROSS-REFERENCE TO RELATED APPLICATION

This application is a continuation-in-part of my copending application Ser. No. 780,296, filed Nov. 29, 1968, now abandoned.

BACKGROUND OF THE INVENTION

This invention relates to the field of organic chemistry and more particularly to iodinated N-acyl derivatives of amino-aromatic carboxylic acids.

N-acyl derivatives of 3-amino-2,4,6-triiodobenzoic acid are well known and their utility as X-ray contrast agents is well established. The pioneer work of V. H. Wallingford, as disclosed in U.S. Pat. No. 2,611,786 has been supplemented and extended by further work of Wallingford and by that of many other workers.

In the form of aqueous solutions of their water-soluble salts, compounds of this general type are widely used in X-ray diagnostic techniques which involve the intravascular administration of the contrast medium. Such techniques include intravenous pyelography, intravenous cholangiography and angiocardiography, among others. Many of these procedures are satisfactorily performed using contrast media solutions of modest concentration (25–50% w./v.). On the other hand, angiocardiography and related vasographic procedures require the use of contrast media solutions of quite high concentrations. For example, solutions containing 80% w./v. of sodium iothalamate (sodium 5-acetamido-2,4,6-triiodo-N-methylisophthalamate—G. B. Hoey, U.S. Pat. No. 3,145,197) are routinely used in such procedures. Moreover, these are injected rapidly in relatively large volumes (50–100 ml. in one to two seconds). Such solutions are, of course, high hypertonic. Even though the compounds thus used have an extremely low intrinsic level of toxicity, the rapid administration of their hypertonic solutions in patients whose health may be poor is accompanied by a significant proportion of reactions.

It has been postulated that compounds capable of producing aqueous solutions of high iodine content, low intrinsic toxicity and reduced tonicity may have advantages as contrast agents, particularly for use in certain vasographic procedures. For example, studies by S. K. Hilal, "Hemodynamic Changes Associated with the Intra-Arterial Injection of Contrast Media," Radiology, 86, 615–633 (1966), indicate that the vasodilatation which follows the injection of hypertonic radiopaque solutions into certain blood vessels is significantly dependent upon the osmolar activity (tonicity) of the contrast agent.

Compounds capable of producing solutions of reduced tonicity without a corresponding decrease in iodine concentration may be produced by linking two 3-amino-2,4,6-triiodobenzoic acid nuclei through the amino groups as acyl derivatives of dicarboxylic acids. Such compounds are disclosed by H. Priewe and R. Rutkowski (U.S. Pat. No. 2,776,241) but these compounds are only modestly water soluble and their toxicity is not particularly low. Somewhat similar derivatives of 3-amino-5-(N-alkylcarbamyl)-2,4,6-triiodobenzoic acids are disclosed by G. B. Hoey (U.S. Pat. No. 3,290,366) and of 3-amino-5-alkanamido-2,4,6-triiodobenzoic acids by A. A. Larsen (U.S. Pat. No. 3,306,927).

The above patents disclose the reaction of 3-aminotriiodobenzoic acids compounds with the acyl halides of dicarboxylic acids to form the desired bis-compounds. In addition to condensations of 3-amino-2,4,6-triiodobenzoic acid, using the acyl halides of simple alkanedicarboxylic acids, Priewe and Rutkowski also disclose the use of acyl halides derived from dicarboxylic acids in which the carbon chain is interrupted by a hetero atom. Such condensations using the dichlorides of diglycolic acid and thiodiglycolic acid are described, for example. Priewe and Rutkowski also suggest that two molecules of 3-amino-2,4,6-triiodobenzoic acid can be linked by reaction with a halide of iminodiacetic acid, HOCOCH$_2$NHCH$_2$COOH. In my hands, attempts at linking two molecules of a 5-substituted 3-amino-2,4,6-triiodobenzoic acid by means of imino-bis-(acetyl·chloride) have been unsuccessful.

SUMMARY OF THE INVENTION

Among the objects of the invention may be mentioned the provision of new and useful X-ray contrast agents; the provision of such agents, solutions of water-soluble salts of which exhibit lower tonicity than conventional aqueous contrast media of equivalent iodine content; and the provision of methods for preparing such X-ray contrast agents. Other objects and features will be in part apparent and in part pointed out hereinafter.

The present invention is thus directed to compounds of the general formula:

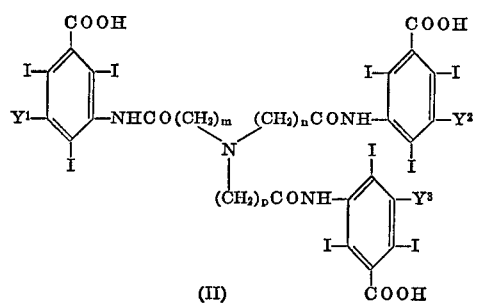

(II)

where $m$, $n$ and $p$ are small integers in the range 1–5 and $Y^1$, $Y^2$ and $Y^3$ are non-ionizing functions known to be compatible with low toxicity and high water solubility in the 2,4,6-triiodobenzoic acid configuration; and the salts thereof with pharmaceutically acceptable cations. Preferred embodiments are those in which $Y^1$, $Y^2$ and $Y^3$ are selected from among hydrogen, carbamyl, N-methylcarbamyl, N,N-dimethylcarbamyl, N-(2-hydroxyethyl)-carbamyl, acetamido, N-methylacetamido and acetamidomethyl functions. $Y^1$, $Y^2$ and $Y^3$ may be the same or different.

The compounds of the invention may be prepared by condensing two moles of m-haloalkanamido-2,4,6-triiodobenzoic acid, such as 3-acetamido-5-chloroacetamido-2,4,6-triiodobenzoic acid, with a mole of m-aminoalkanamido-2,4,6-triiodobenzoic acid, such as 5-aminoacetamido-2,4,6-triiodo-N-methylisophthalamic acid. In practice, it has been found desirable to use an excess of about 20% of the haloalkanamido-triiodobenzoic acid. The condensation may be carried out in either one or two steps. Greater structural variety may be achieved by using a different haloalkanamido compound in each step of the two-step process, isolating the intermediate iminodiacyl-diimino-bis-(2,4,6-triiodobenzoic acid) compound that is formed in the first step. This is illustrated in the following sequences:

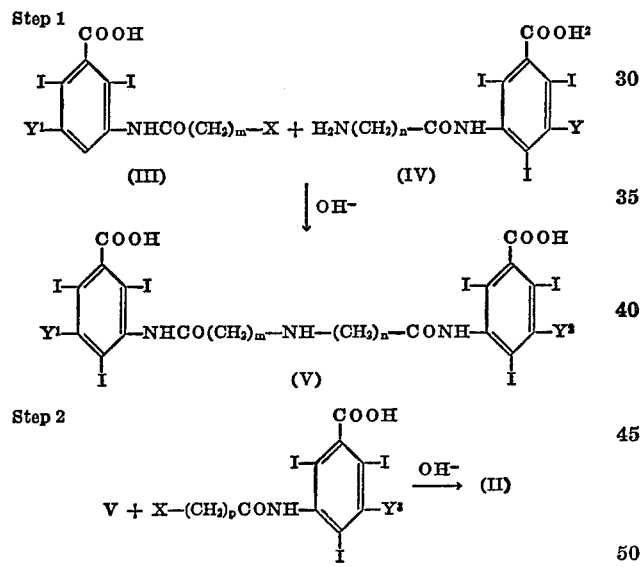

In these structures, $m$, $n$, $p$, $Y^1$, $Y^2$ and $Y^3$ have the meanings previously assigned, and X represents a halo function.

In the special case where $m=n$ and $Y^1=Y^2$, the condensation may be carried out in a single step, as mentioned above and schematically represented below:

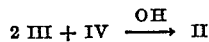

The preparation of a variety of metachloroacetamido-2,4,6-triiodobenzoic acids and metaaminoacetamido-2,4,6-triiodobenzoic acids that are useful in the preparation of the compounds of the present invention is disclosed in D. W. Chapman's U.S. Pat. No. 3,210,412. Chapman prepared the amino compounds by ammonolysis of the chloro compounds in a large excess of ammonia solution. In connection with the present invention, it has been found that a small proportion (about 4%) of a corresponding iminodiacyldiimino-bis - (2,4,6 - triiodobenzoic acid) compound is formed as a by-product under the conditions disclosed by Chapman.

When the desired product is a symmetrical compound, and, in addition, the groups $Y^1$, $Y^2$ and $Y^3$ are acylated amino groups, then formation of an aza-tris structure may be accomplished before iodination. The following reaction sequence is illustrative:

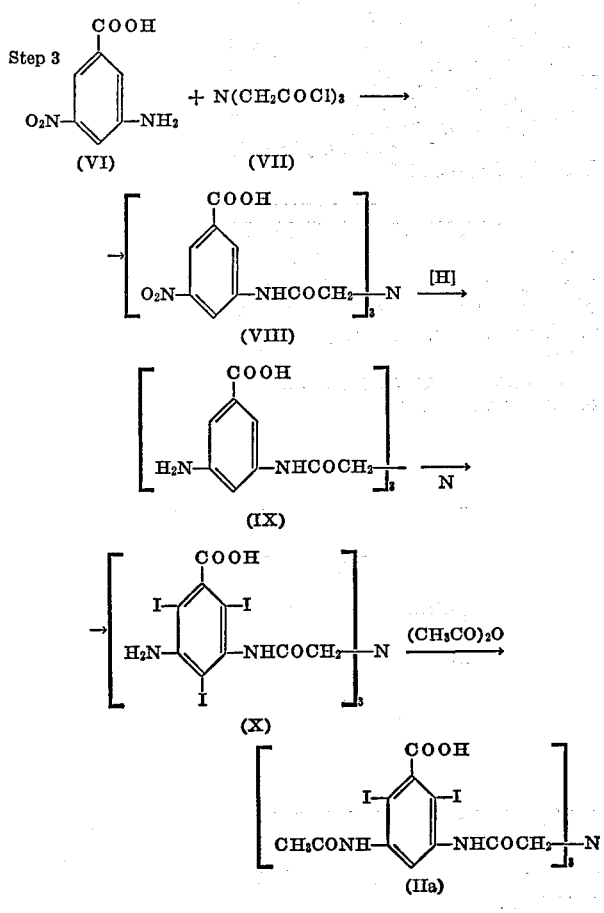

The compounds of the invention are useful in the preparation of X-ray contrast media. Salts of the acids defined above with pharmaceutically acceptable cations conventionally used in aqueous contrast media solutions, such as sodium, calcium, magnesium, N-methylglucamine and diethanolamine salts, may be administered intravascularly. In addition to solutions of single salts, solutions containing two or more different cations, such as sodium and calcium, sodium and N-methylglucamine, or sodium, calcium and N-methylglucamine may be prepared. Similar solutions of multiple cations with other iodinated anions are disclosed in U.S. Pat. Nos. 3,175,952, 3,325,370 and 3,347,746.

The route of excretion varies, between the biliary and urinary systems, depending on the precise nature of the compound used and on the animal species being examined. Those members of the series primarily excreted through the biliary system may be used to visualize structures of that system, such as the gall-bladder and ducts. Those excreted primarily by the kidney may be used to visualize structures of the urinary system. The low toxicity of such compounds, when coupled with high salt solubility permits their use in vasographic procedures. Moreover, solutions of the water-soluble salts are significantly less hypertonic than solutions of equivalent iodine content in which the iodine is carried in a compound having the mono- or bis-triiodobenzoic acid configuration.

DESCRIPTION OF THE PREFERRED EMBODIMENTS

The invention is further illustrated by the following examples:

EXAMPLE 1

5,5′,5″-(nitrilotriacetyltriimino)-tris-(2,4,6-triiodo-N-methylisophthalamic acid)

(I: $Y^1$, $Y^2$, $Y^3$=CH₃NHCO; $m$, $n$, $p$=1)

A soltuion of 3-aminoacetamido-2,4,6-triiodo-N-methylisophthalamic acid (U.S. Pat. No. 3,210,412—850 g., 1.35 moles), in 90 ml. of 50% sodium hydroxide solution diluted with 2500 ml. of water, and a solution of 3-chloroacetamido-2,4,6-triiodo-N-methylisophthalamic acid (U.S. Pat. No. 3,210,412—1930 g., 2.98 moles) in 3500 ml. of water and 190 ml. of 50% NaOH solution was added. The mixture was stirred and heated on a steam bath at 80–85° C. for 25 hours. An additional 125 ml. of 50% NaOH solution was added in 3 portions during the first few hours of heating to hold the alkanlinity in the range of pH 9.5–10.0 (80–85° C.). After about six hours the alkalinity was adjusted to pH 9.82. After 14 hours the pH was 9.6.

During one hour the reaction mixture was added, at 35–45° C., to a solution consisting of 3300 ml. of hydrochloric acid (37% HCl) diluted with 3300 ml. of water. The precipitate was separated, reslurried in 11 liters of water, again separated, and dried at 100° C.

The crude product (2935 g.), prepared as described above, was dissolved in methanol (10 l.) and a solution of sodium hydroxide (202 g.) in methanol (1000 ml.) was added. The alkalinity of the resulting solution was about pH 8–9. The solution was concentrated to a thin slurry (5–5.5 liters) under reduced pressure in a rotating evaporator and allowed to stand at room temperature overnight. The precipitate was collected, slurried in 500 ml. of cold methanol, filtered off and dried at 70° C. Yield: 1188 g. of sodium salt of 5,5′,5″-(nitrilotriacetyltriimino)-tris-(2,4,6-triiodo-N-methylisophthalamic acid). Of this product 1108 g. was dissolved in 3800 ml. of water, and the solution was treated twice with decolorizing charcoal (75 g. portions) at 65° C. The decolorized solution was added to 2200 ml. of dilute acid (1200 ml. of 10% HCl and 1000 ml. of water) at 55–65° C. The precipitate was collected, reslurried in 11 liters of water, collected again, dried at 85–95° C. overnight, then at 100° C. for several additional hours. Yield 790 g. 5,5′,5″-(nitrilotriacetyltriimino)-tris-(2,4,6-triiodo-N - methylisophthalamic acid). Additional crops of product were obtained from the methanolic mother liquors, the total yield being 1243 g. (47.1%).

*Analysis.*—Calculated for $C_{33}H_{24}I_9N_7O_{12}$ (percent): C, 21.39; H, 1.30; I, 61.65; N, 5.29—neutral equivalent, 617. Found (percent): C, 21.15; H, 1.57; I, 61.01; N, 5.16—neutral equivalent, 614 (after correction for 2.91% water found by Karl Fischer titration).

M.P. 284° C. with decomposition. Thin layer chromatography on a silicic acid plate (Mallinckrodt 7GF), using a mixture of 150 ml. isopropyl alcohol and 70 ml. of ammonium hydroxide solution (27% NH₃) as the developing solvent, showed substantially a single spot.

As long as the reaction mixture is fairly strongly alkaline, the precise level of alkalinity does not appear to be critical. Results similar to those described above have been obtained carrying out the condensation at alkalinity levels in the range of pH 11.4–12.8.

EXAMPLE 2

N-methylglucamine salt of 5,5′,5″ - (nitrilotriacetyltriimino)-tris-(2,4,6-triiodo-N-methylisophthalamic acid)

The product of the preparation described in Example 1 is converted to a solution of its N-methylglucamine salt by conventional methods. The water solubility of this salt is not less than 80% w./v. at 25° C.

The acute I.V. $LD_{50}$ of the N-methylglucamine salt in mice is 12,390±752.

When tested by a modification of the technique described by Whiteleather and deSaussure (Radiology, 67: 537–43; 1956), damage to the blood brain barrier of the dog from the administration of a solution of this N-methylglucamine salt is comparable to that of an iothalamate solution of equivalent iodine concentration.

Comparative osmolality values for a solution of the N-methylglucamine salt of 5,5′,5″-(nitrilotriacetyltriimino)-tris-(2,4,6-triiodo-N-methylisophthalamic acid) and corresponding solutions of two previously known related compounds are shown in the table.

TABLE

Osmolality values for solutions of selected 2,4,6-triiodo-N-Methylisophthalamic acid derivatives

| | | Characteristics of solution | | |
| --- | --- | --- | --- | --- |
| Parent acid | Salt | Salt concentration, percent (w./v.) | Iodine concentration, percent (w./v.) | Osmolality [4] (milliosmoles/kg. H₂O) |
| A [1] | N-methylglucamine | 59.93 | 28.2 | 1,784 |
| B [2] | do | 60.89 | 28.2 | 1,419 |
| C [3] | do | 60.20 | 28.2 | 1,165 |

[1] Acid A is 5-acetamido-2,4,6-triiodo-N-methylisophthalamic acid (also known as iothalamic acid).

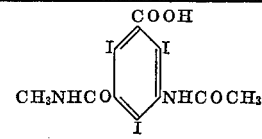

[2] Acid B is 5,5′-(adipoyldiimino)-bis-(2,4,6-triiodo-methylisophthalamic acid) (U.S. 3,290,366).

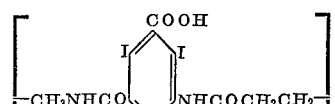

[3] Acid C is 5,5′,5″-(nitrilotriacetyltriimino)-tris-(2,4,6-triiodo-N-methylisophthalamic acid).

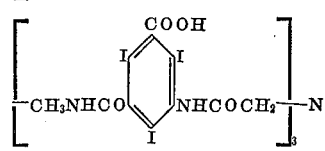

[4] Osmolality was determined by means of an osmometer (Osmet 2007 Model supplied by Precision Systems, 6 Cornell Road, Framingham, Mass.).

EXAMPLE 3

Sodium salt of 5,5′,5″-(nitrilotriacetyltriimino)-tris-(2,4,6-triiodo-N-methylisophthalamic acid)

The product of the preparation described in Example 1 is converted to a solution of its sodium salt by conventional methods. The water solubility of this sodium salt is approximately 60–65% (w./v.) at 25° C.

The acute I.V. toxicity of this salt and its capacity to damage the blood brain barrier are comparable to the same properties of the N-methylglucamine salt of Example 2.

EXAMPLE 4

5,5′,5″-(nitriolotriacetyltriimino)-tris-(3-acetamido-2,4,6-triiodobenzoic acid)

(IIa: $Y^1$, $Y^2$, $Y^3$=CH₃CONH; $m$, $n$, $p$=1)

The intermediates used herein were prepared generally as disclosed in U.S. Pat. No. 3,210,412, the ammonolysis of 3 - acetamido-5-chloroacetamido-2,4,6-triiodobenzoic acid to the 5-aminoacetamido compound being allowed to proceed for eight days.

3 - acetamido - 5-aminoacetamido-2,4,6-triiodobenzoic acid (IVa: $Y^2$=CH₃CONH; $n$=1) (210 g., 0.33 mole) was slurried in 1.2 liters of water and 50% NaOH was added to dissolve it. To this, 3-acetamido-5-chloroacetamido-2,4,6-triiodobenzoic acid (IIIa: $Y^1=CH_3CONH$ $m=1$; $X=Cl$)

(475 g., 0.73 mole) and 50% NaOH were added, keeping the pH at approximately 9.5.

The solution temperature was maintained at 80–85° C. for 27 hours. NaOH was added periodically to readjust the pH to about 9.5. The reaction was terminated by addition of 4 liters of 18% HCl. The precipitate was collected and dried at 120° C.

The slightly damp material from above was dissolved in 4 liters of methanol and a small amount of insoluble material (NaCl) was removed by filtration. The solution was adjusted to pH 3 with a 20% solution of NaOH in methanol and more solid separated. This material (118 g.), too, was largely NaCl. The methanol solution was made alkaline (pH 10), the volume was reduced to 1.5 liters and the solution was refrigerated. Yield, 270 g. of sodium salt of the desired product. This was acidified to yield 211 g. of 5,5′,5″-(nitrilotriacetyltriimino)-tris-(3-acetamido-2,4,6-triiodobenzoic acid) (IIa). The product was purified again by precipitating the sodium salt from methanol as above (180 g.), acidifying and drying 24 hours to remove excess HCl. N.E. 616/617 after correcting for 0.8% water; M.P. 258–266° C. (dec.).

TLC on a silicic acid plate, with isopropyl alcohol (150)/ammonium hydroxide (70) indicated that the product was predominantly the desired tris-acid (IIa) but contained a small proportion of "bis"-precurso (5,5′-iminodiacetyldiimino) - bis - (2,4,6-triiodobenzoic acid) (Va: $Y^1$, $Y^2=CH_3CONH$; $m, n=1$).

Analysis.—Calc. for $C_{33}H_{24}I_9N_7O_{12}$ (percent): C, 21.39; H, 1.30; I, 61.65; N, 5.29; O, 10.36. Found (percent): C, 21.61; H, 1.69; I, 59.83; N, 5.37; O, 10.01.

EXAMPLE 5

3 - acetamido - 3′ - (N-methylacetamido)-3″-(N-methylcarbamyl) - 5,5′,5″ - (nitrilotriacetyltriimino) - tris- (2,4,6-triiodobenzoic acid)

(IIb: $Y^1=CH_3CONH$; $Y^2=CH_3CON(CH_3)$; $Y^3=CH_3NHCO$; $m, n, p=1$)

(A) 5 - chloroacetamido-2,4,6-triiodoisophthalamic acid (IIIb: $Y^1=CH_3NHCO$; $m=1$; $X=Cl$).—5-amino-2,4,6-triiodo-N-methylisophthalamic acid (150 lbs.), prepared generally as described by G. B. Hoey (U.S. Pat. No. 3,145,197), was dissolved as the sodium salt, the hot solution (pH 5) was treated with charcoal and ammonium chloride (165 lbs.) was added. The stirred system was cooled to 20° C., the precipitated ammonium salt was separated, and the liquor was discarded. The precipitate was dissolved in hot sodium hydroxide solution (65 gal. water plus 2.5 gal. 50% NaOH solution). The solution was added to an excess of acid (15 gal. water plus 57 lbs. 37% HCl) to precipitate the free acid, which was recovered and dried at 70° C. Neutral equiv.—570.9 found/571.9 theory; TLC with isopropyl alcohol (150)/ammonium hydroxide (30) produced a single spot.

The purified 5 - amino - 2,4,6 - triodo-N-methylisophthalamic acid (125 lbs.) was slurried with dimethylacetamide (18.3 gal.). Sulfuric acid (724 ml. of 98% $H_2SO_4$) was added, followed by chloroacetyl chloride (3.3 gal.), added during 15 minutes. The temperature rose to 90° C. as the solid dissolved. Shortly thereafter, the product began to precipitate and the mixture became very viscous. One hour 45 minutes after completing addition of the chloroacetyl chloride the viscous mixture was broken up and water (13.2 gal.) was added. The mixture was stirred and cooled overnight, then the solids were separated and slurried in 25 gal. methanol. The mixture was allowed to stand two days. The solids were separated, dissolved in water (31 gal.), with the aid of NaOH (final pH 8). The solution was heated to 60° C. and 27% ammonia solution (1.6 gal.) was added to hydrolyze any N,N′-bis(chloroacetyl) by-product that may have formed. After heating for 5 minutes the solution was acidified to pH 5, using HCl. After a charcoal treatment the solution was added during an hour to a rapidly stirred acid solution (10.4 gal. water plus 26 lbs. of 37% HCl). The slurry was stirred and cooled overnight, the precipitated product (IIIb) was separated, reslurried in water (20 gal.), isolated and dried at 60° C. Neutral equiv.: Found, 657.8/ theory, 648.4; TLC (isopropanol/ammonium hydroxide): a single spot with several slight impurities indicated.

Analysis.—Calc. for $C_{11}H_8ClI_3N_2O_4$ (percent): Cl, 5.47; I, 58.7. Found (percent): Cl, 5.75; I, 57.67.

(B) 5-aminoacetamido - 2,4,6 - triiodo-N-methylisophthalamic acid (IV b: $Y^2=CH_3NHCO$; $n=1$).—Purified 5 - chloroacetamido - 2,4,6 - triiodo-N-methylisophthalamic acid (IIIb) was ammonolyzed to crude IVb essentially as described by D. W. Chapman (U.S. Pat. No. 3,210,412). Examination by TLC indicated the presence of about 3–4% of 5,5′-iminodiacetyldiimino-bis(2,4,6-triiodo-N-methylisophthalamic acid (Vb:

$Y^1$, $Y^2=CH_3NHCO$ $m, n=1$) and a smaller proportion of the corresponding tertiary amine. The crude product was purified using the following procedure.

The crude IVb (28 lbs.) was slurried in dilute $H_2SO_4$ (50 gal. water plus 56.5 lbs. of 98% $H_2SO_4$) at 40° C. The slurry was heated to 83° and stirred until solution was effected. The solution was treated with charcoal and the filtrate was diluted to 70 gal. and stirred about 80 hours at room temperature. The precipitate was filtered off, and the filtrate was neutralized with $NH_4OH$. This was cooled and stirred overnight, and the precipitate was collected and dried. The resulting product was again subjected to the purification scheme described above. The final product showed the following. Neutral equiv.: Found, 620/theory, 629 (uncorrected for $H_2O$); TLC: One spot with a trace of the secondary/tertiary amine impurities.

(C) 3-acetamido - 5 - chloroacetamido - 2,4,6 - triiodobenzoic (IIIa: $Y^1=CH_3CONH$; $m=1$, $X=Cl$).—3-acetamido-5-amino-2,4,6-triiodobenzoic acid (228 g.) was slurried in chloroform (400 ml.), and dimethylacetamide (200 ml.) was added. The resulting semi-solid mass was broken up to form a thick slurry, and chloroacetyl chloride (110 ml.) was added during 2½ minutes. The reaction mixture was stirred 80 minutes and was then poured into 800 ml. of cold water. The product precipitated as a gummy mass. The liquids were decanted, and the chloroform was removed from the liquid layer under reduced pressure. The gum and water were recombined and diluted to 2200 ml., and the gum was dissolved at pH 11 by means of sodium hydroxide and heating the mixture at 70° C. for 70 minutes. The solution was slightly acidified (pH 5–6) and treated with charcoal at 50–65° C. and the resulting clear filtrate was added to an excess of acid (300 ml. water plus 60 ml. of 37% HCl). The precipitate (IIIa) was separated, reslurried in 800 ml. of water, isolated and dried. Yield, 84.4%. Neutral equiv.: Found, 658.1/theory, 648.4.

Analysis.—Calc. for $C_{11}H_8I_3N_2O_4$ (percent): C, 20.37; H, 1.24; Cl, 5.46; I, 58.72. Found (percent): C, 20.47; H, 1.42; Cl, 5.57; I, 59.98.

(D) 3-chloroacetamido - 2,4,6 - triiodo-5-(N-methylacetamido)-benzoic acid (IIIc: $Y^1=CH_3CON(CH_3)$; $m=1$, $X=Cl$).—3-amino - 2,4,6 - triiodo-5-(N-methylacetamido)-benzoic acid is required as an intermediate for the preparation of IIIc. Use of the methylation procedure of H. Holtermann et al. (U.S. Pat. No. 3,178,473) produces a mixture of exo/endo isomers as disclosed by Holtermann. The alkylation method of V. H. Wallingford (U.S. Pat. No. 3,346,630) was therefore used to obtain a product consisting largely of a single isomer.

Sodium ethoxide solution was prepared by the slow dissolution of 164.8 g. (7.16 g. atoms) of metallic sodium in 6400 ml. of anhydrous ethanol (Treasury Dept. Formula SDA 2B). 5-acetamido-3-amino-2,4,6-triiodobenzoic acid (2,048 g., 3.58 moles) was dissolved in the sodium ethoxide solution. The solution was cooled to 22° C., and methyl iodide (3.77 moles) was added during 16 minutes. The reaction mixture was heated at 45–75° C. for two hours, after which the alcohol was stripped off and the residue taken up in water (8 l.). The solution was filtered and treated with charcoal at pH 5–6. The filtrate from the charcoal treatment was added to an excess of acid (2500 ml. of water plus 666 ml. of 37% HCl). The precipitated product was collected, reslurried, collected again and dried at 70° C. Yield of 3-amino-2,4,6-triiodo - 5 - (N-methylacetamido)-benzoic acid, 1963 g. (93%). Neutral equiv.: Found, 594.0/theory, 585.9. TLC [benzene (120)/methyl ethyl ketone (MEK) (50)/acetic acid (20)] produced essentially a single spot. NMR indicated the product consisted almost wholly of a single isomer.

3-amino - 2,4,6 - triiodo-5-(N-methylacetamido)-benzoic acid (IIIc), 29.4 g. (88.8%), TLC [benzene (120)/chloroform (50 ml.) and dimethylacetamide (25 ml.). Chloroacetyl chloride (13.8 ml.) was added all at once, and the solution was stirred for an hour. Water (100 ml.) was added, the volume was reduced to 150 ml., and water (300 ml.) was again added to cause precipitation. The solids were collected and reslurried in water (100 ml.), and sodium hydroxide solution (5 ml. of 50% NaOH) was added to dissolve the solids. The solution was heated to 70–75° C. for an hour, acidified (pH 5–6) with acetic acid, and treated with charcoal. The filtrate from the charcoal treatment was added to a warm (60° C.) acid solution (38 ml. water plus 7 ml. of 37% HCl). The resulting slurry was stirred and filtered and the product dried under vacuum at 70° C. overnight. Yield of 3-chloroacetamido-2,4,6-triiodo - 5 - (N-methylacetamido)-benzoic acid (IIIc), 29.4 g. (88.8%). TLC [benzene (120)/MEK (50)/acetic acid (20)] produced a single spot. Neutral equiv.: Found, 662.6/theory, 662.4.

*Analysis.*—Calc. for $C_{12}H_{10}ClI_3N_2O_4$ (percent): Cl, 5.35; I, 57.48. Found (percent): Cl, 5.37; I, 57.55.

(E) 3 - acetamido - 3' - (N - methylcarbamyl)-5,5'-(iminodiacetyldiimino) - bis - (2,4,6-triiodobenzoic acid) (Vc: $Y^1$=CH₃NHCO; $Y^2$=CH₃CONH; $m, n$=1).—5-aminoacetamido - 2,4,6-triiodo-N-methylisophthalamic acid (IVb; 2516 g., 4 moles) was slurried in 7.54 liters of water and dissolved by the addition of 452 g. (5.66 moles) of 50% sodium hydroxide solution. While this solution was heated on a steam bath, a solution of 3-acetamido-5-chloroacetamido-2,4,6-triiodobenzoic acid (IIIa; 1297 g., 2 moles), dissolved in 3.73 liters of water plus 226 g. of 50% NaOH, was added during 105 minutes at 88° C. The solution was stirred 1 hour and added to 12 liters of water plus 6 liters of 37% HCl at 80–90° C. The precipitated acid formed a large gummy mass which readily solidified upon cooling. TLC indicated that the product contained about 80% of the desired product (Vc), about 10% starting material (IVb) and about 10% tertiary amine impurities, presumed to be primarily 3,3'-bis-acetamido-3''-(N - methylcarbamyl) - 5,5',5'' - (nitrilotriacetyltriimino) - tris - (2,4,6-triiodobenzoic acid (IIc; $Y^1$, $Y^2$=CH₃CONH- $Y^3$=CH₃NHCO; $m, n, p$=1).

This precipitate was dissolved in a slight excess of sodium hydroxide solution, and the resulting solution was acidified (pH 4–5) with acetic acid and treated with charcoal. The filtrate from the charcoal treatment was added to 13 liters of water plus 5.5 liters of 37% HCl to cause precipitation.

A portion of this crude product (1638 g.) was slurried in 32.8 liters of water and dissolved by the addition of 409 ml. of 50% NaOH. The product was reprecipitated by the addition of 65.5 liters of acetic acid (final pH 1.8). The precipitation mixture was stirred overnight, and the precipitate was collected and dried. Yield, 916 g. A portion of this product (100 g.) was redissolved in sodium hydroxide solution which was then added to an excess of dilute HCl. The resulting precipitate of Vc was collected and dried. Neutral equiv.: Found, 619.1/theory, 620.4.

*Analysis.*—Calc. for $C_{22}H_{17}I_6N_5O_6$ (percent): C, 21.29; H, 1.38; I, 61.37; N, 5.64. Found (percent): C, 21.20; H, 1.70; I, 61.11; N, 5.48.

(F) 3-acetamido - 3' - (N - methylacetamido)-3''-(N-methyl - carbamyl)-5,5',5''-(nitrilotriacetyltriimino)-tris-(2,4,6 - triiodobenzoic acid) (IIb).—3-acetamido-3'-(N-methylcarbamoyl)-5,5' - (iminodiacetyldiimino) - bis-(2,4,6-triiodobenzoic acid) (Vc) (27.3 g., 0.022 mole) was slurried in 60 ml. of water, and dissolved by the addition of 6 ml. of 50% NaOH (final pH 10.9). 3-chloroacetamido-5-(N - methylacetamido)-2,4,6-triiodobenzoic acid (IIIc; 14.6 g.) was added, and the reaction mixture was heated on the steam bath at 77–80° C. for 15 hours. Nearly all the Vc was consumed. The reaction mixture was added to an excess of hydrochloric acid (100 ml. of 3 M HCl) at 70° C., and the precipitate was collected. A small portion was redissolved in sodium hydroxide solution and reprecipitated in excess hydrochloric acid solution, washed and dried. Neutral equiv.: Found 613/theory, 622.2.

*Analysis.*—Calc. for $C_{34}H_{26}I_9N_7O_{12}$ (percent): C, 21.88; H, 1.40; I, 61.18; N, 5.25. Found (percent): C, 22.12; H, 1.52; I, 59.4; N, 4.92.

EXAMPLE 6

N - methylglucamine salt of 5,5',5''-(nitrilotriacetyltriimino)-tris-(3-acetamido - 2,4,6 - triiodobenzoic acid)

The product of the preparation described in Example 4 is converted to a solution of its N-methylglucamine salt by conventional methods. The water solubility of this salt is not less than 70% w./v. at 25° C.

The acute I.V. LD₅₀ of the N-methylglucamine salt in mice is 14,300 mg./kg.

EXAMPLE 7

N-methylglucamine salt of 3-acetamido-3'-(N-methylacetamido) - 3'' - (N - methylcarbamyl)-5,5',5''-(nitrilotriacetyltriimino) - tris - (2,4,6 - triiodobenzoic acid)

The product of the preparation described in Example 5 is converted to a solution of its N-methylglucamine salt by conventional methods. The water solubility of this salt is not less than 74.7% w./v. at 25° C.

The acute I.V. LD₅₀ of the N-methylglucamine salt in mice is 10,000 mg./kg.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

What is claimed is:
1. A compound selected from the group consisting of compounds represented by the general formula:

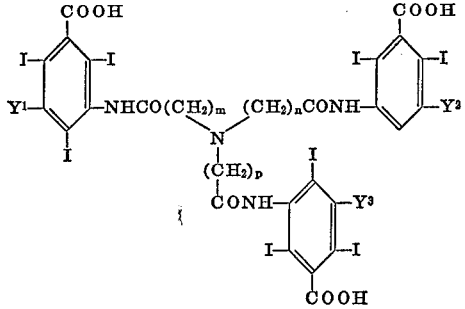

wherein $m$, $n$ and $p$ are small integers in the range of 1–5 and $Y^1$, $Y^2$ and $Y^3$ are selected from the group consisting of hydrogen, carbamyl, N-methylcarbamyl, N,N-dimethylcarbamyl, N-(2 - hydroxyethyl)-carbamyl, acetamido, N-methylacetamido and acetamidomethyl functions; and the water-soluble salts thereof with pharmaceutically acceptable cations.

2. A compound as defined by claim 1 wherein $m$, $n$ and $p$ are 1 and $Y^1$, $Y^2$ and $Y^3$ are N-methcarbamyl.

3. A compound as defined by claim 2 wherein the compound is a sodium salt.

4. A compound as defined by claim 2 wherein the compound is an N-methylglucamine salt.

5. A compound as defined by claim 1 wherein $m$, $n$ and $p$ are 1 and $Y^1$, $Y^2$ and $Y^3$ are acetamido.

6. A compound as defined by claim 1 wherein $m$, $n$ and $p$ are 1 and $Y^1$, $Y^2$ and $Y^3$ are N-methylacetamido.

7. A compound as defined by claim 1 wherein $m$, $n$ and $p$ are 1, $Y^1$ is acetamido, $Y^2$ is N-methylacetamido and $Y^3$ is N-methylcarbamyl.

8. A compound as defined by claim 5 wherein the compound is an N-methylglucamine salt.

9. A compound as defined by claim 5 wherein the compound is a sodium salt.

10. A compound as defined by claim 7 wherein the compound is an N-methylglucamine salt.

References Cited

UNITED STATES PATENTS

| | | | |
|---|---|---|---|
| 3,210,412 | 10/1965 | Chapman | 260—518 A |
| 2,776,241 | 1/1957 | Priewe | 260—518 A |

LEON ZITVER, Primary Examiner

M. W. GLYNN, Assistant Examiner

U.S. Cl. X.R.

260—518 A; 424—5

UNITED STATES PATENT OFFICE
CERTIFICATE OF CORRECTION

Patent No. 3,781,338  Dated December 25, 1973

Inventor(s) Philip E. Wiegert

It is certified that error appears in the above-identified patent and that said Letters Patent are hereby corrected as shown below:

Column 10, the formula in claim 1 should appear as follows:

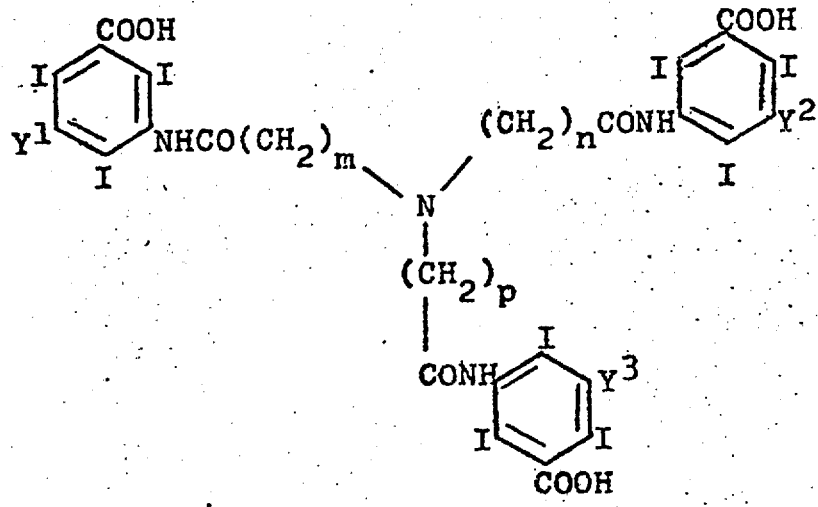

Signed and sealed this 21st day of May 1974.

(SEAL)
Attest:

EDWARD M.FLETCHER,JR.
Attesting Officer

C. MARSHALL DANN
Commissioner of Patents